US008868263B2

(12) United States Patent
Munir et al.

(10) Patent No.: US 8,868,263 B2
(45) Date of Patent: Oct. 21, 2014

(54) SPACECRAFT MOMENTUM MANAGEMENT USING SOLAR ARRAY

(75) Inventors: Mohammad Saghir Munir, Union City, CA (US); John Hutton Cooper, Sunnyvale, CA (US); Philip Conway Hirschberg, Fremont, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 738 days.

(21) Appl. No.: 13/115,370

(22) Filed: May 25, 2011

(65) Prior Publication Data
US 2012/0303185 A1    Nov. 29, 2012

(51) Int. Cl.
*B64G 1/24*  (2006.01)
*G05D 1/00*  (2006.01)
*G05D 1/08*  (2006.01)

(52) U.S. Cl.
CPC .................................. *G05D 1/0883* (2013.01)
USPC .................................................. 701/13; 701/3

(58) Field of Classification Search
CPC .......... B64G 1/285; B64G 1/286; B64G 1/44; B64G 1/407; B64G 1/443; B64G 1/24; B64G 1/26; B64G 1/283; B64G 1/506; B64G 1/428; B64G 1/366; B64G 1/365; B64G 1/288; B64G 2001/245; G05D 1/0883
USPC ................ 701/13, 3, 531; 244/165, 168, 169, 244/172.7, 172.8, 3.21, 171
See application file for complete search history.

(56) References Cited

U.S. PATENT DOCUMENTS

| 4,325,124 | A |   | 4/1982  | Renner |
|-----------|---|---|---------|--------|
| 4,591,116 | A |   | 5/1986  | Guenther |
| 4,949,922 | A |   | 8/1990  | Rosen |
| 5,133,518 | A |   | 7/1992  | Flament |
| 5,149,022 | A |   | 9/1992  | Flament |
| 5,305,971 | A |   | 4/1994  | Decanini |
| 5,310,144 | A |   | 5/1994  | Salvatore |
| 5,816,540 | A |   | 10/1998 | Murphy et al. |
| 5,906,339 | A |   | 5/1999  | Basuthakur |
| 5,996,942 | A | * | 12/1999 | Price et al. ..................... 244/168 |
| 6,672,544 | B2 |  | 1/2004  | McGovern et al. |
| 2009/0230250 | A1 | * | 9/2009 | Wehner et al. ............. 244/172.7 |

* cited by examiner

*Primary Examiner* — Marthe Marc-Coleman
(74) *Attorney, Agent, or Firm* — Weaver Austin Villeneuve & Sampson LLP

(57) ABSTRACT

Stored momentum on a spacecraft is managed by determining a target profile of stored momentum as a function of time for the spacecraft; measuring a difference between a momentum value actually stored on the spacecraft and a desired momentum value, where the desired momentum value substantially conforms to the target profile at a particular time; reducing the difference by producing a torque on the spacecraft, where the torque results from selectively controlling at least one solar array position offset angle, the offset angle being an offset of at least one solar array of the spacecraft from a nominal sun pointing direction.

33 Claims, 12 Drawing Sheets

SPACECRAFT MOMENTUM MANAGEMENT USING SOLAR ARRAY

TECHNICAL FIELD

This invention relates generally to spacecraft attitude control systems and, in particular, to using a spacecraft solar array to manage spacecraft momentum.

BACKGROUND

The assignee of the present invention manufactures and deploys spacecraft for, inter alia, communications and broadcast services. The three axis orientation of these spacecraft with respect to celestial bodies such as the earth and sun must be controlled in a desired attitude within a narrow tolerance.

An orbiting spacecraft is subjected to a disturbance torque environment sufficient to perturb the spacecraft from the desired attitude, at least in the absence of counteracting torques from a spacecraft attitude control system and/or propulsion system. A major component of the disturbance torque environment has a substantially periodic nature. For example, as disclosed in McGovern, et al., U.S. Pat. No. 6,672,544 (hereinafter, McGovern), assigned to the assignee of the present invention, and hereby incorporated by reference in its entirety, solar torques, i.e., torques resulting from solar radiation impingement on spacecraft surfaces, have a sinusoidal profile, and represent an important disturbance torque component for an Earth-pointing satellite.

Spacecraft attitude control systems and/or propulsion systems counteract these and other attitude disturbances using a combination of attitude sensors and actuators. For example, orbiting spacecraft often employ Earth sensors, which provide continuous measurements of roll and pitch. By responding to these measurements with an appropriate set of commanded control torques, using feedback control techniques, measured roll and pitch angles may be kept close to commanded roll and pitch angles.

Control torques may be generated by a number of known devices and methods. For example, spacecraft torque actuators may include chemical and/or electric thrusters, magnetic torquers, and momentum storage systems including one or more momentum and/or reaction wheels (hereinafter, "reaction wheel(s)". In addition, control torques may be generated by solar sailing techniques. The latter techniques typically require the spacecraft's solar arrays to be offset from a nominal solar normal position (at which position, power generation efficiency is maximum), in order to produce a torque. For example, in a known technique, a solar panel array configuration is adjusted when a roll angle error of a spacecraft exceeds a determined threshold value, so as to produce a torque sufficient to reduce the roll angle error. Solar sailing techniques generally require a significant array offset from solar normal, resulting in a substantial power loss penalty to the spacecraft.

Momentum storage systems have been employed to store accumulated momentum resulting from the disturbance torque environment, and thereby reduce the pointing disturbance and propellant usage associated with a thruster actuation. These systems, consisting of one or more reaction wheels, have a storage capacity that may be described in terms of a permissible range of wheel speeds. As a result, a momentum management strategy must use thrusters or other actuators to unload momentum in order to prevent wheel speeds from going outside the permissible range.

As disclosed by McGovern, when the disturbance torque profile is known in advance, a prediction of wheel speed profile may be made with reasonable accuracy. The prediction can be used for a more fuel-efficient momentum management strategy. Nevertheless, according to the disclosure of McGovern, momentum unloads using thrusters are required, resulting in a significant propellant expenditure, with a consequent shortening of spacecraft maneuver life.

As a result, improved techniques of managing spacecraft momentum are needed.

SUMMARY OF INVENTION

The present inventors have recognized that a spacecraft momentum management system may advantageously use a variably commanded solar array offset to cause actually stored spacecraft momentum to closely track a target profile. In an embodiment, a requirement for thruster actuations to unload momentum is substantially eliminated, and a power loss due to solar array offset is minimal.

Advantageously, an estimate of the cyclical component of the stored spacecraft momentum target profile at a given instant may be subtracted from the actually stored spacecraft momentum to compute a momentum "error". The momentum error may then be substantially eliminated by providing a variably commanded solar array offset. In an embodiment, only a non-cyclical component of spacecraft momentum is unloaded by the solar array offset. As a result of this technique, the inventors have found, the magnitude of the solar array offset may be minimized, and associated power losses made negligibly small. Moreover, an amount of actuation of a solar array drive assembly mechanism associated with momentum management is minimized. This not only minimizes power loss due to solar array offset, but also prevents over actuation of the mechanism.

In an embodiment, spacecraft momentum is managed by: (i) determining a target profile of stored momentum as a function of time for the spacecraft; (ii) measuring a momentum storage error (MSE), where the MSE is the difference between a momentum value actually stored on the spacecraft and a desired momentum value, and the desired momentum value substantially conforms to the target profile at a particular time; (iii) reducing the MSE by producing a torque on the spacecraft, where the torque results from selectively controlling at least one solar array position offset angle, and the offset angle is an offset of at least one solar array of the spacecraft from a nominal sun pointing direction.

In another embodiment, the spacecraft has two solar arrays, and the MSE is reduced by selectively controlling the solar array position offset of only one of the two solar arrays.

In a further embodiment, the spacecraft has two solar arrays, and the MSE is reduced by selectively controlling the solar array position offset of each of the two solar arrays such that a first offset of a first solar array is substantially equal in magnitude and opposite in sign to a second offset of a second solar array.

In yet another embodiment, the target profile has a periodic component and the spacecraft includes momentum storage devices having a capacity sufficient to store the periodic component. The periodic component of the target momentum profile may be determined using a harmonic torque estimator (HTE). The HTE may be configured to (i) receive respective input values for an angular velocity of the spacecraft relative to an inertial frame, a wheel speed of at least one reaction wheel, a predicted external torque, and (ii) estimate observable periodic torque based on the received respective input values.

In a further embodiment, the measuring step and the reducing step are performed as part of a substantially continuous feedback control loop.

In another embodiment, the measuring step is performed episodically at a first discrete interval and the reducing step is performed episodically at a second discrete interval. The first discrete interval may be less than one hour and the second discrete interval may be in the range of four to forty eight hours.

In an embodiment each of the target profile and the actually stored momentum value are determined separately with respect to each of a yaw axis and a roll axis of the spacecraft, and the produced torque is one of (i) a substantially pure inertial yaw torque, and (ii) a combined inertial roll/yaw torque. The produced torque may be the combined inertial roll/yaw torque selected from among (i) positive roll/positive yaw, (ii) positive roll/negative yaw, (iii) negative roll/positive yaw, and (iv) negative roll/negative yaw, such that the produced torque reduces at least one of a roll MSE and a yaw MSE. The produced torque may reduce both roll MSE and yaw MSE.

In another embodiment, the MSE comprises a roll MSE, a yaw MSE, and a pitch MSE, and at least the roll MSE and the yaw MSE are reduced without recourse to a spacecraft propulsion system.

In an embodiment, the pitch MSE is reduced by the spacecraft propulsion subsystem. The pitch MSE may be periodically reduced by the spacecraft propulsion subsystem only during low thrust north south stationkeeping maneuvers. The pitch MSE may be unloaded by the spacecraft propulsion subsystem only during east west stationkeeping maneuvers.

In another embodiment, the pitch MSE is reduced without recourse to the spacecraft propulsion system. The pitch MSE may be reduced by producing a pitch torque on the spacecraft, said pitch torque resulting from at least one of adjusting an angle of at least one solar array with respect to a pitch axis of the spacecraft and actuating a solar array trim tab.

In an embodiment the offset angle is not greater than 15 degrees.

In further embodiment, selectively controlling at least one solar array position offset excludes reversing direction with respect to a nominal solar array rotation.

In another embodiment, a low thrust north south stationkeeping thruster may be employed to remove a residual roll/yaw momentum error.

In yet another embodiment reducing the MSE by producing a torque on the spacecraft, may include determining a solar array position offset to be controlled, an associated resulting torque, and a corresponding profile of wheel speed of a momentum storage device with respect to time; and feeding forward the corresponding profile of wheel speed with respect to time to the momentum storage device.

In an embodiment, a spacecraft includes a satellite control electronics and at least one solar array, and the satellite control electronics is configured to manage momentum of the spacecraft by: (i) determining a target profile of stored momentum as a function of time for the spacecraft; (ii) measuring a momentum storage error (MSE), where the MSE is the difference between a momentum value actually stored on the spacecraft and a desired momentum value, and the desired momentum value substantially conforms to the target profile at a particular time; (iii) reducing the MSE by producing a torque on the spacecraft, where the torque results from selectively controlling at least one solar array position offset angle, and the offset angle is an offset of at least one solar array of the spacecraft from a nominal sun pointing direction.

BRIEF DESCRIPTION OF THE DRAWINGS

Features of the invention are more fully disclosed in the following detailed description of the preferred embodiments, reference being had to the accompanying drawings, in which.

Figure 1:
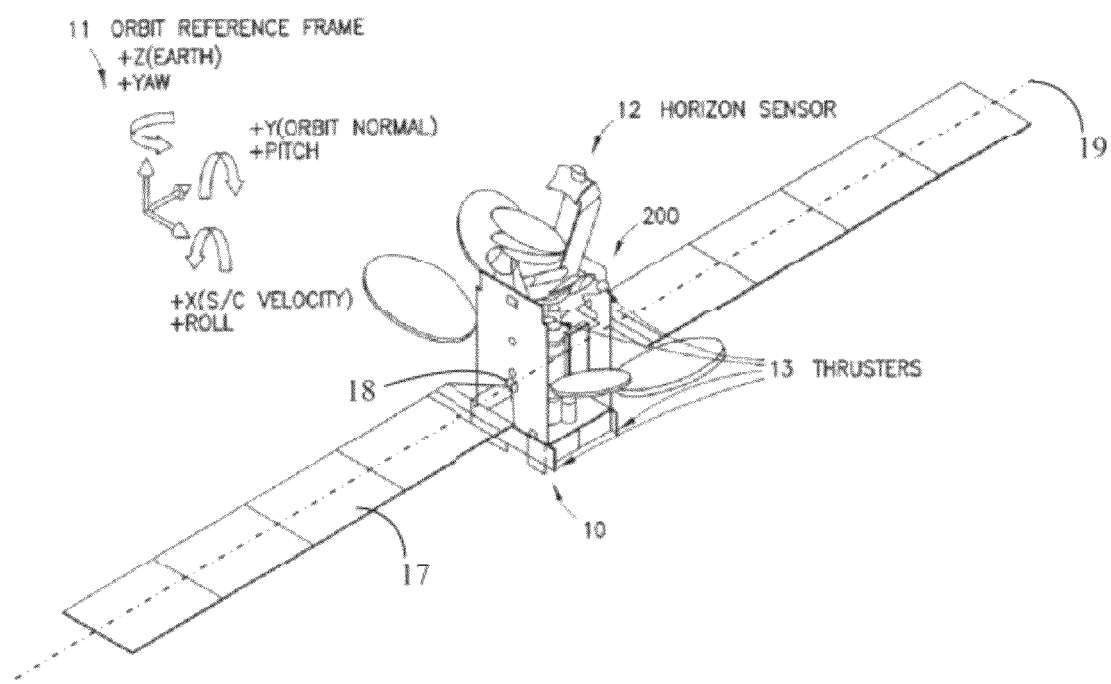
FIG. 1 illustrates a spacecraft and spacecraft body coordinate system.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

Referring to FIG. 1, an Earth-pointing three axis stabilized spacecraft 10 is illustrated within a reference spacecraft body coordinate frame 11 having roll ($x_{body}$), pitch ($y_{body}$) and yaw ($z_{body}$) axes. Conventionally, the yaw axis is defined as being directed along a line intersecting the Earth center of mass and spacecraft center of mass; the roll axis is defined as being perpendicular to the yaw axis, lying in the plane of the orbit in the direction of the spacecraft velocity vector; and the pitch axis, normal to the orbit plane, completes a three-axis, right-hand orthogonal system. Reference frame 11 may rotate with respect to inertial space. For example, for a geosynchronous satellite, orbit reference frame 11 may rotate about the pitch axis once every sidereal day, i.e., every 23.93 hours. Although the present invention is described with reference to an Earth-pointing satellite in an orbit reference frame, it can be generalized to a satellite fixed in any frame that rotates relative to inertial space.

With further reference to FIG. 1, it is illustrated that spacecraft 10 may have one or more photovoltaic solar arrays 17, for converting solar radiation into electrical power. Each solar array 17 may be rotatably coupled to spacecraft 10 by way of a mechanism, for example, solar array drive assembly (SADA) 18. SADA 18 may be operated so as to rotate solar array 17 with respect to spacecraft 10 about an axis of rotation 19 so as maximize solar power conversion efficiency. For example, SADA 18 may cause a surface of solar array 17 to "track" the sun such that the surface is constantly at an angle approximately perpendicular to a plane defined by the sun and axis of rotation 19. Such a sun-tracking angle may be referred to hereinafter as a "nominal sun pointing direction". It will be understood, however, that a nominal sun pointing direction may not, in general, result in an array surface being perpendicular to the sun direction, because axis of rotation 19 may, for example, be parallel to the pitch axis, which is normal to the spacecraft orbit plane, with the result that axis of rotation 19 may itself be at an inclination angle with respect to the sun direction.

Figure 2:
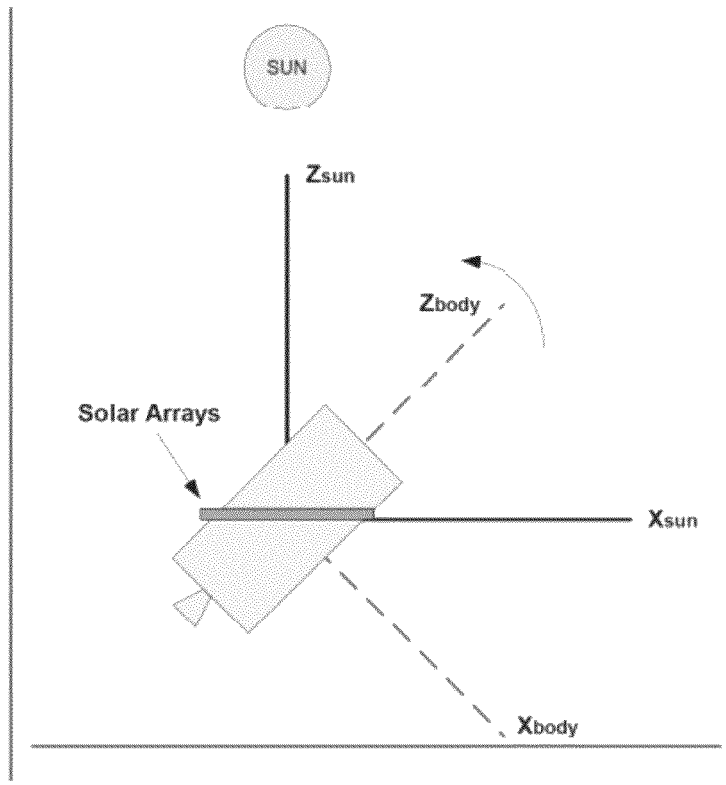
FIG. 2 illustrates a sun frame coordinate system.

Referring now to FIG. 2, a second coordinate frame, denominated the "Sun frame" is illustrated. The Sun frame, which may be considered as the primary inertial reference frame, is defined such that its origin is the spacecraft origin (conventionally, the spacecraft nominal center of gravity), the $y_{sun}$ axis, orthogonal to the plane of FIG. 2, is aligned with the axis of rotation of solar array 17, and $z_{sun}$ is directed towards the Sun but projected into the spacecraft $x_{body}$-$z_{body}$ plane.

Figure 3:
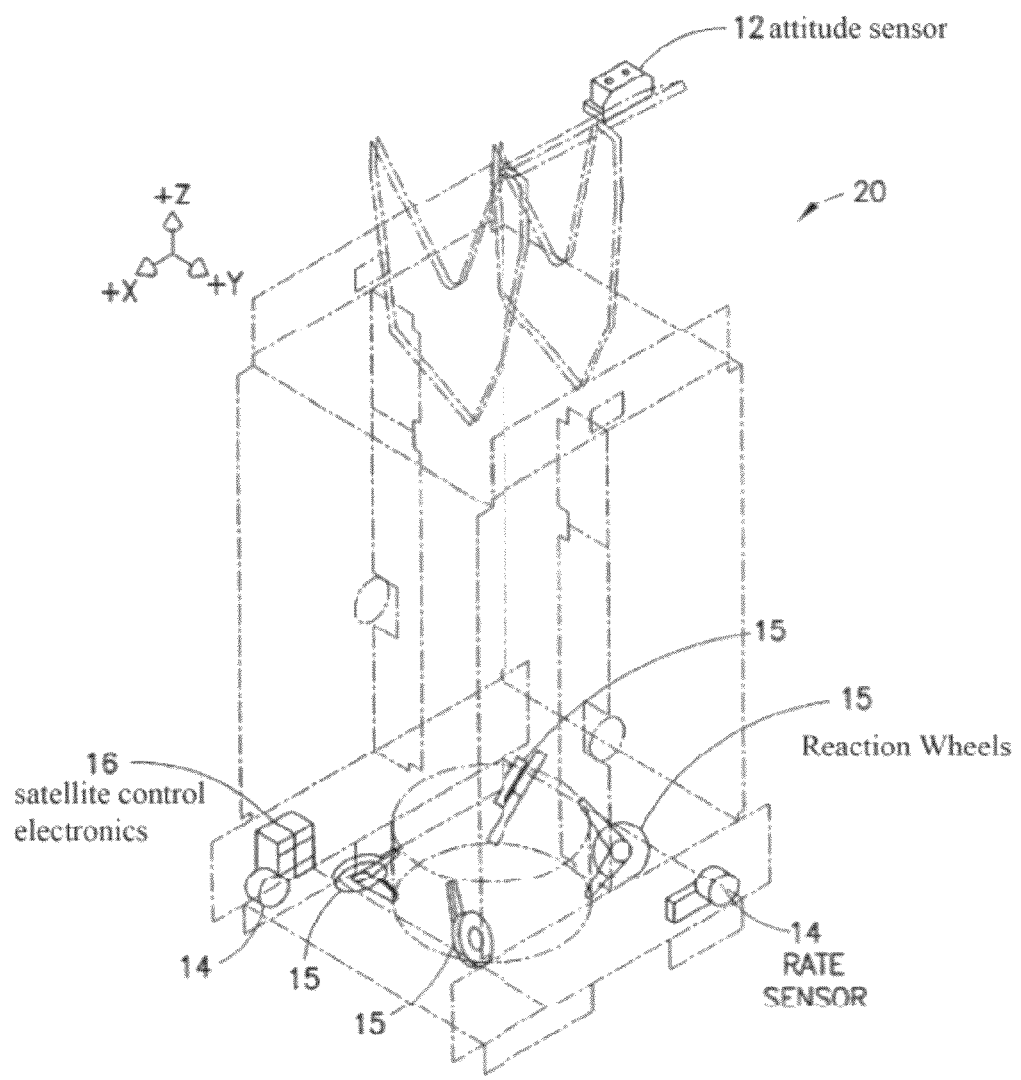
FIG. 3 illustrates a spacecraft attitude control system, according to an embodiment.

Referring now to FIG. 3, an example of one embodiment of the physical hardware comprising an attitude control system for a spacecraft is illustrated. As illustrated in FIG. 3, the attitude control system 20 may generally comprise an attitude sensor 12, one or more rate sensors 14, reaction wheels 15, and satellite control electronics 16. In an embodiment, the attitude sensor 12 may include an Earth sensor and/or a star tracker, and the rate sensor 14 may include ring laser gyros. The terms "roll/pitch attitude sensor" and "Earth sensor" will be used interchangeably herein, and generally refer to any sensor capable of measuring roll and pitch angles. The satellite control electronics 16 is generally configured to run control algorithms associated with the attitude control system 20, including, for example, a harmonic torque estimator. In an embodiment, satellite control electronics 16 is configured to run a solar array momentum management (AMM) control algorithm described hereinafter.

As noted hereinabove, a dominant disturbance torque encountered by an Earth-pointing satellite results from impingement of solar radiation. As a result of the satellite's orbital rotation about the earth, solar radiation pressure produces a periodic disturbance torque having a sinusoidal profile in the spacecraft body frame, which, unless counteracted, will result in an oscillation in spacecraft angular momentum. The oscillation in spacecraft angular momentum may be counteracted by transferring momentum to one or more spacecraft momentum storage devices, which may include, for example, one or more spacecraft reaction wheels 15. Advantageously, the spacecraft momentum storage devices may be sized so as to have a combined capacity sufficient to counteract the effects of the above-mentioned periodic disturbance torque, integrated over time.

Figure 4:
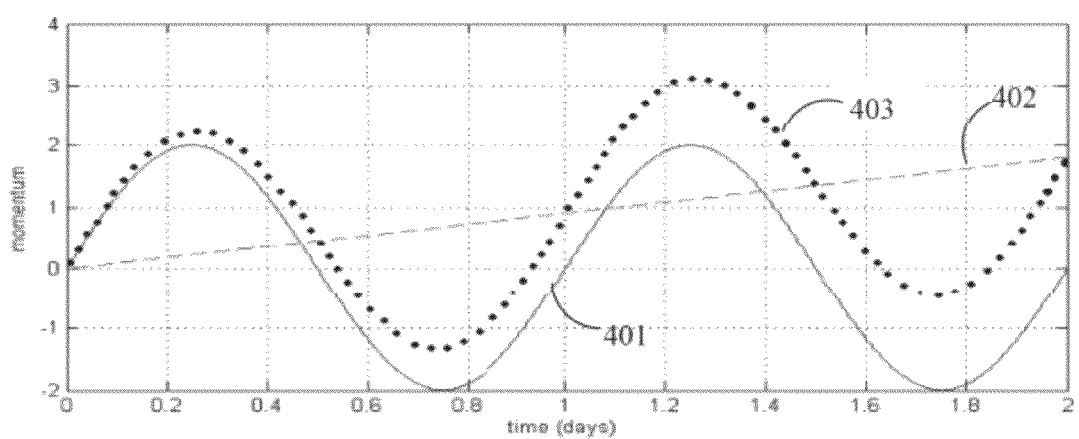
FIG. 4 illustrates models of momentum accumulation as a function of time.

As illustrated in FIG. 4, however, disturbance torques experienced by the spacecraft may result in momentum accumulation having a secular component 402 as well as periodic component 401. The periodic component 401 may be approximately sinusoidal in nature. It may be observed that a sum 403 of periodic component 401 and secular component 402 resembles a ramping sinusoid.

Advantageously, the spacecraft momentum storage devices may be sized such that the periodic component 401 may be counteracted without resorting to wheel unloads using thrusters or other actuators. Counteracting secular component 402 with the spacecraft momentum storage devices, however, will, in the absence of performing momentum unloads, ultimately result in saturation of the spacecraft momentum storage devices.

Figure 5A:
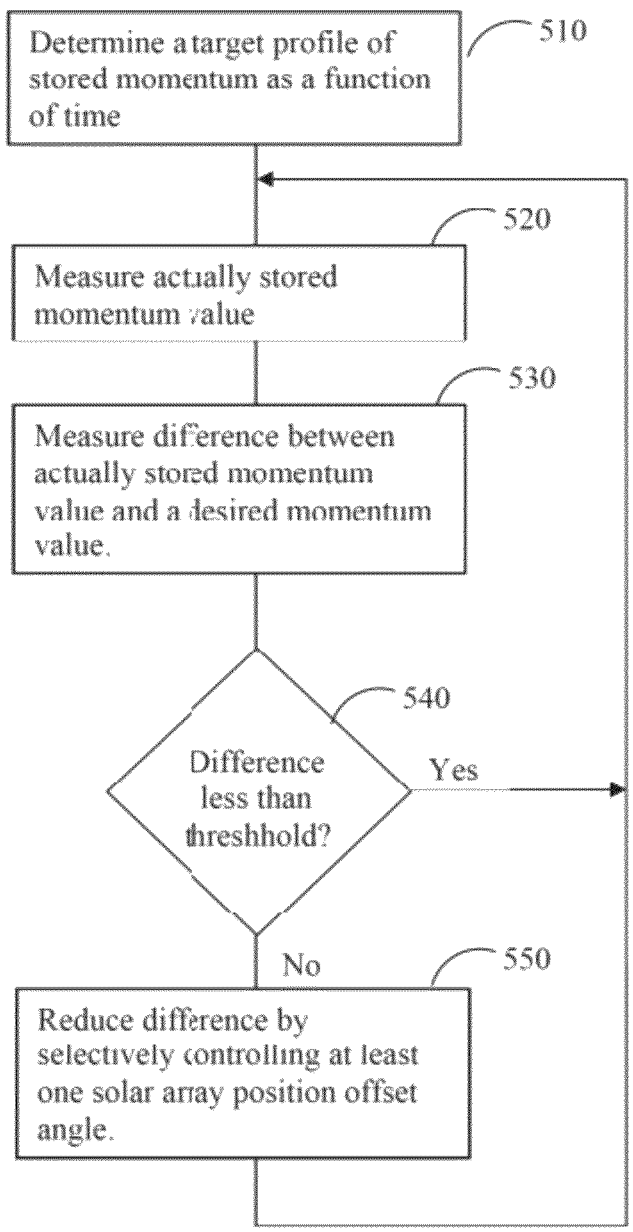
FIGS. 5A and 5B are flow charts illustrating techniques of array momentum management, according to an embodiment.

The present inventors have developed AMM techniques that prevent saturation of the spacecraft momentum storage devices, while substantially eliminating a need to use thrusters to perform momentum unloads. Referring now to FIG. 5A, in an embodiment of an AMM technique, a determination step 510 results in a target profile of stored momentum as a function of time. The target profile may be determined, for example, in light of the external torque environment experienced by a spacecraft and in light of characteristics of the spacecraft momentum storage equipment and/or other characteristics of the spacecraft. The target profile may have a periodic component and, advantageously, the spacecraft momentum storage devices may have a capacity sufficient to store the periodic component An actually stored momentum value at a particular time may be measured, step 520, by, for example, measuring wheel speeds of one or more reaction wheels onboard the spacecraft.

The measured value of the actually stored momentum value may be compared to a desired momentum value, where the desired momentum value conforms, at least approximately, to the target profile at the particular time at which the actually stored momentum is measured. At step 530, a difference between the measured actual momentum and the desired momentum may be measured. This difference may also be referred to herein as a "momentum storage error" (MSE).

The MSE may be compared to a threshold value, step 540. When the MSE is less than the threshold, steps 520-540 may be repeated. Steps 520-540 may be repeated immediately, or after a discrete interval. In an embodiment, the discrete interval may be an hour or less. When the computed difference is greater than the threshold, the MSE may be reduced, step 550, by selectively controlling at least one solar array position offset angle, so as to produce a torque on the spacecraft, where the offset angle is an offset of at least one solar array of the spacecraft from a nominal sun pointing direction. Following the reducing step 550, steps 520-550 may be repeated. In an embodiment, the threshold may be selected such that a time interval between successive executions of step 550 may be within the range of four to 48 hours.

Figure 5B:
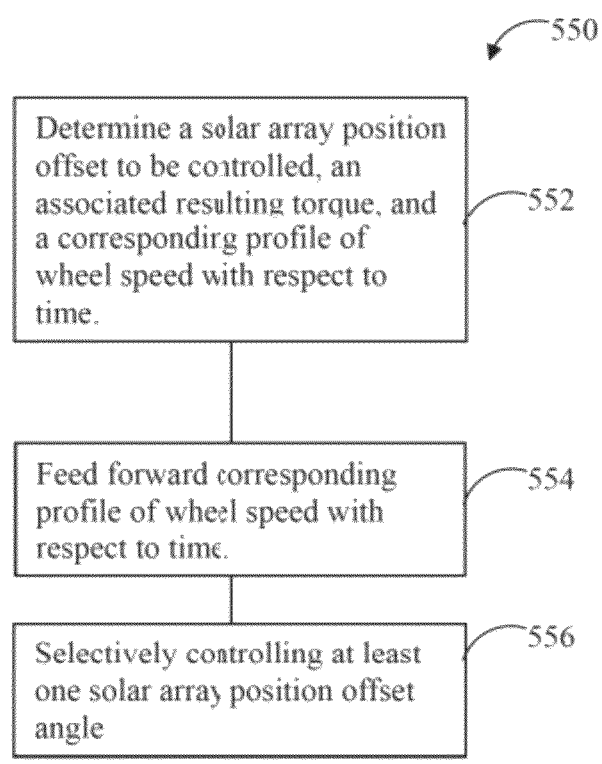

Advantageously, referring now to FIG. 5B, step 550 of reducing the difference between the actually stored momentum value and the desired momentum value, may include the following steps. A solar array position offset to be controlled may be determined, step 552. At about the same time, as part of step 552, an associated torque, resulting from the solar array position offset, and a corresponding profile of reaction wheel speed as a function of time may be determined. Advantageously, the corresponding profile of reaction wheel speed as a function of time is determined so as to substantially offset the associated torque, resulting from the solar array position offset. The corresponding profile of reaction wheel speed as a function of time may be fed forward, step 554, through the satellite control electronics. As a result, advantageously, substantially all the associated torque resulting from selectively controlling the solar array position offset, step 556, is absorbed by an offload of momentum from the reaction wheel, and very little or no satellite attitude disturbance is experienced.

In an embodiment, each of the target profile and the actually stored momentum value are determined separately with respect to each of a yaw axis and a roll axis of the spacecraft, and the produced torque is one of (i) a substantially pure inertial yaw torque, and (ii) a combined inertial roll/yaw torque.

Figure 6:
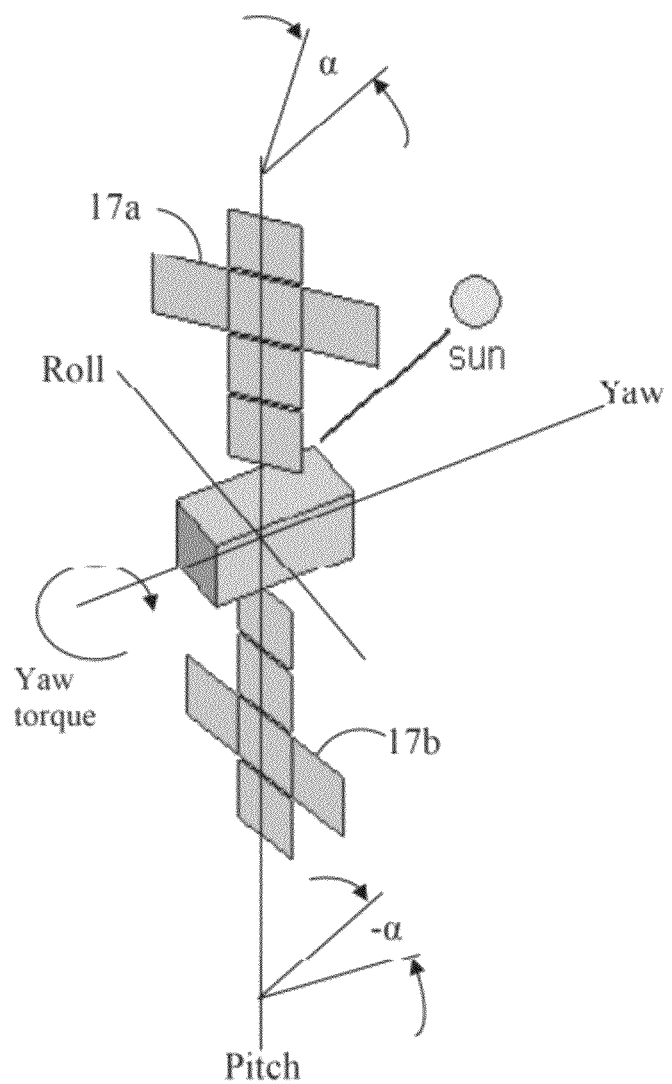
FIG. 6 illustrates solar array offsets suitable for provision of a yaw torque, according to an embodiment.

Illustrative techniques for producing a torque on the spacecraft by selectively controlling at least one solar array position offset angle will now be described. In a condition when each of a first solar array 17a and a second solar array 17b is in the nominal sun pointing direction, the solar arrays are substantially co-planar and net solar torque is minimized. When, however, an increased torque about a spacecraft axis is desired, in order, for example, to reduce the momentum storage error, an array offset angle may be controlled so as to generate such increased torque. More specifically, referring now to FIG. 6, a substantially pure yaw torque may be provided by selectively controlling the solar array position offset of each of said two solar arrays such that a first offset angle α of solar array 17a is substantially equal in magnitude and opposite in sign to a second offset angle of solar array 17b. In such case, a substantially pure torque about the yaw axis may result, that may be characterized as a "windmill" torque.

Figure 7:
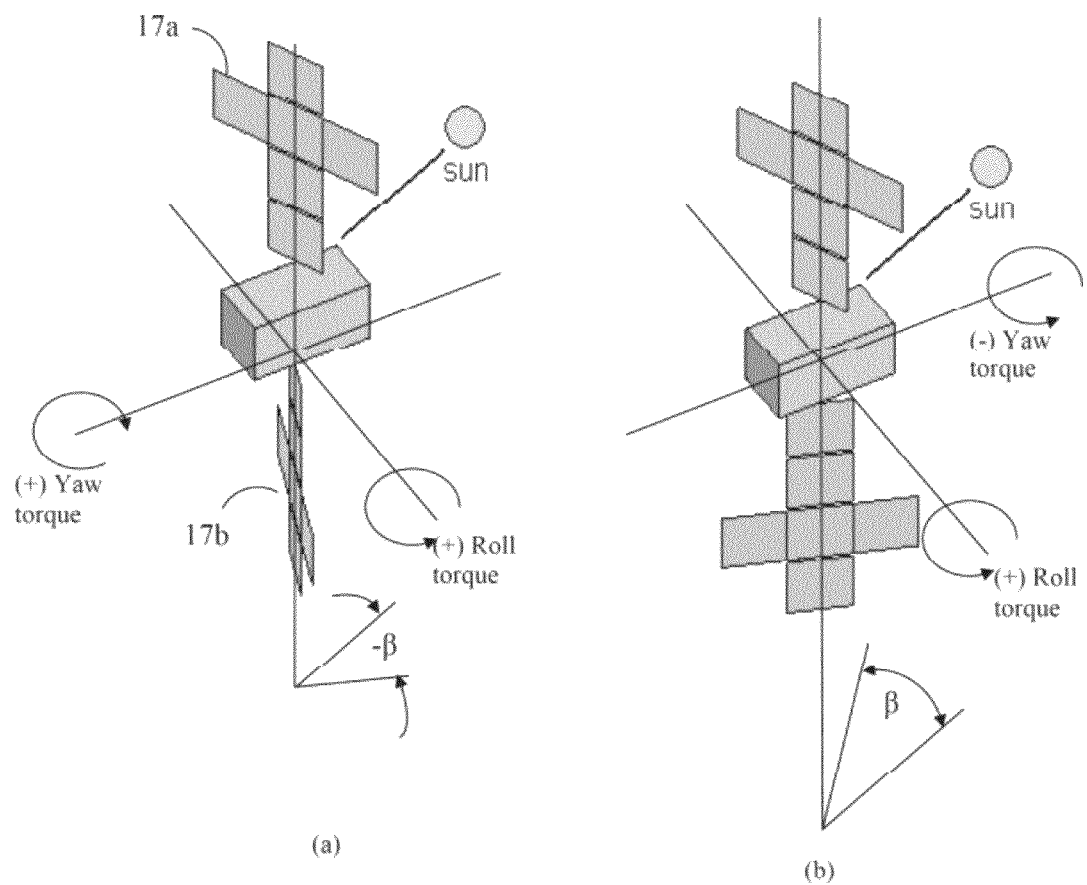
FIG. 7 illustrates solar array offsets suitable for provision of a roll/yaw torque, according to an embodiment.

Referring now to FIG. 7, an increased torque about the roll axis may be provided by controlling a respective offset angle of at least one of solar array 17a and solar array 17b such that an unequal offset angle results. This may be accomplished by, for example, controlling an offset angle of solar array 17b with respect to the nominal sun pointing direction, while solar array 17a remains oriented in the nominal sun pointing direction.

It should be noted that a yaw torque component is also generated by the foregoing technique. In the example illustrated in FIG. 7(a), for example, a negative offset angle of solar array 17b produces a positive roll torque and a positive yaw torque. In the example illustrated in FIG. 7(b), on the other hand, a positive offset angle of solar array 7b is shown to produce a positive roll torque and a negative yaw torque.

Figure 8:
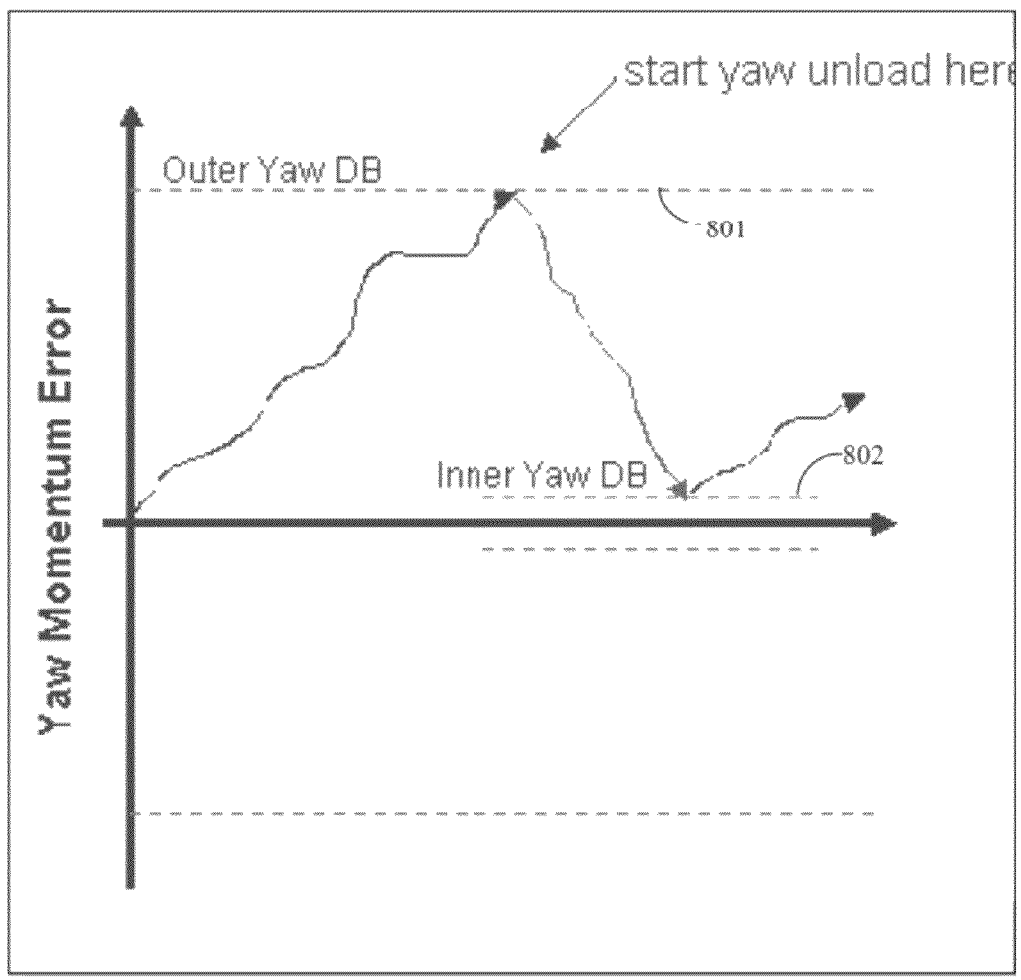
FIG. 8 illustrates yaw momentum error in the sun frame coordinate system as a function of time according to an embodiment.

In an embodiment, torques controlled using the foregoing techniques may be used to regulate momentum stored on the spacecraft so that it tracks a target profile. For example, MSE with respect to the yaw axis ("yaw MSE") may be maintained less than a specified threshold. In an embodiment, referring now to FIG. 8, yaw MSE may be maintained between outer yaw deadband 801 and inner yaw deadband 802.

Figure 9:
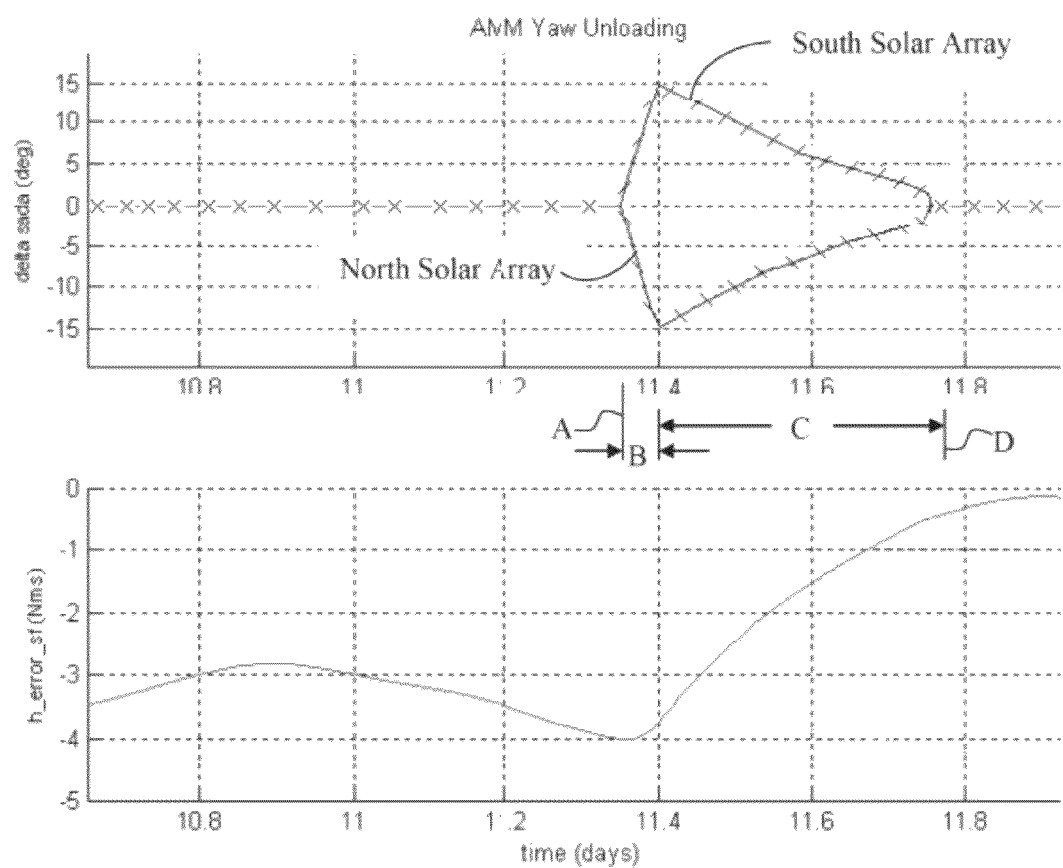
FIG. 9 illustrates results of a simulation of yaw momentum error management, according to an embodiment.

Referring now to FIG. 9, results are illustrated of a simulation of the foregoing yaw momentum management strategy. For the illustrated example, a specified outer yaw MSE deadband of 4 newton-meter-seconds (Nms), and a specified inner deadband of 0.5 Nms are assumed. At time 'A', when yaw MSE reaches the specified outer dead band, a counteracting torque may be applied to reduce this error. A substantially pure yaw torque may be provided by controlling a respective offset angle of each of two solar arrays such that an equal and opposite offset angle α is provided with respect to the nominal sun pointing direction. In the illustrated example, this offset angle is initially driven, over time interval 'B', to 15 degrees. The offset angle may be gradually reduced, over time interval 'C', until, at time 'D', the offset angle is approximately zero, and the yaw MSE is approximately equal to the specified inner yaw deadband.

Figure 10:
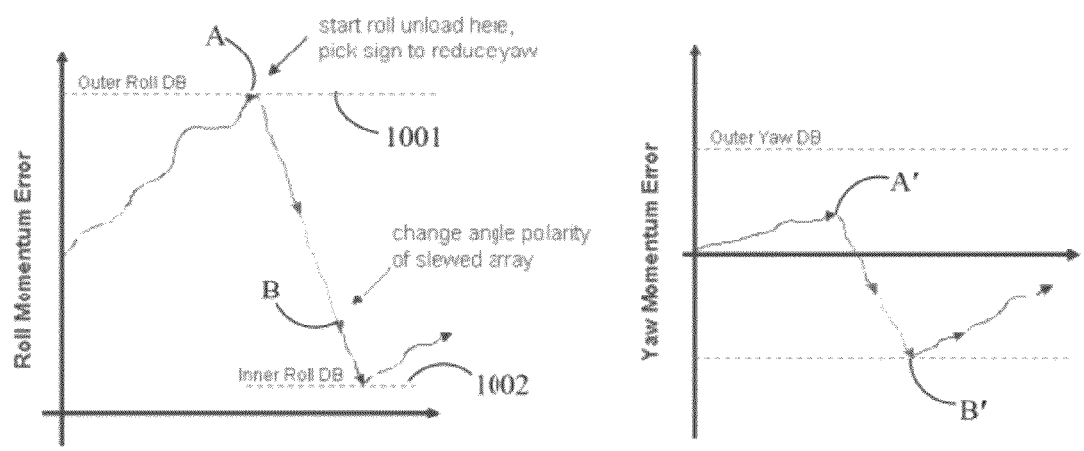
FIG. 10 illustrates roll/yaw momentum error in the sun frame coordinate system as a function of time, according to an embodiment.

Referring now to FIG. 10, a roll momentum error control strategy is illustrated, whereby roll MSE may be maintained between outer roll deadband 1001 and inner roll deadband 1002. Because producing roll torque by controlling a respective offset angle of each of two arrays to be unequal also produces yaw torque, roll MSE and yaw MSE may, advantageously, be managed together. For example, when starting roll momentum unload (FIG. 10, points A, A') the direction of the solar array offset may be selected such that the yaw error is also at least initially decreased. In the event that the duration of the roll unload is such that yaw MSE approaches a specified limit, the polarity of the roll offset may be reversed (FIG. 8, points B, B'), thereby allowing the roll momentum error to be continuously reduced, while reversing an increase in the yaw momentum error.

Figure 11:
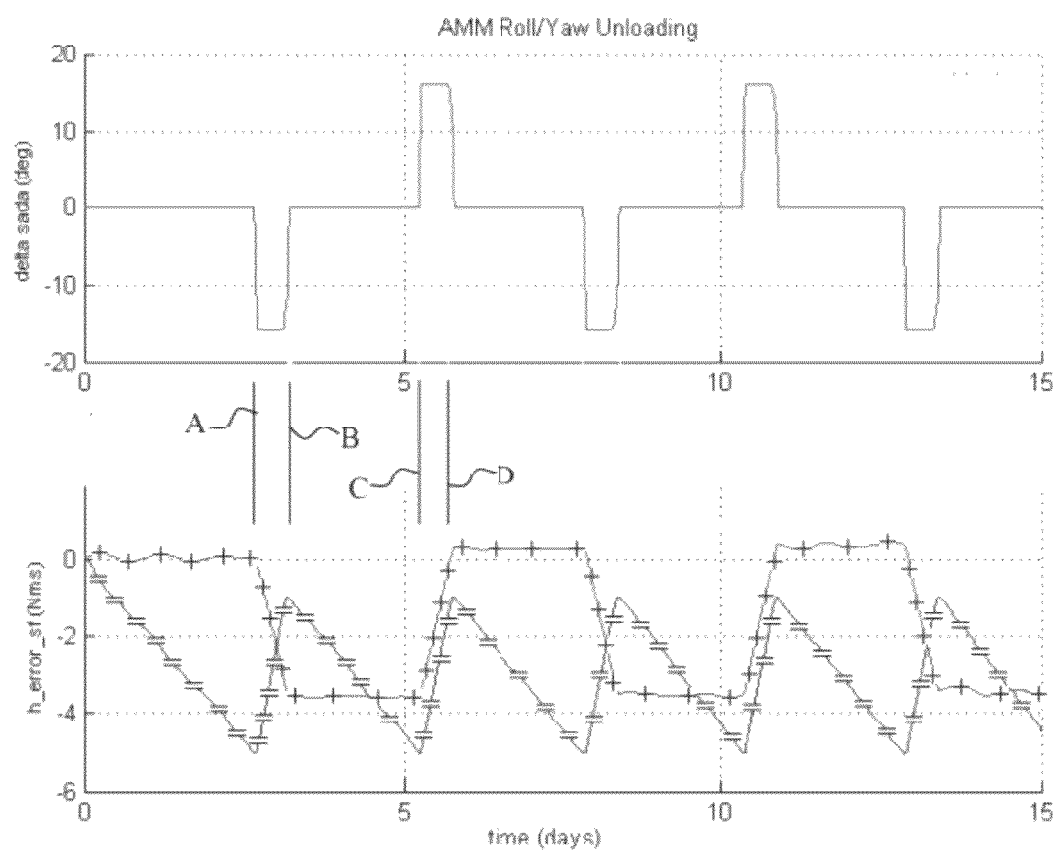
FIG. 11 illustrates results of a simulation of roll/yaw momentum error management, according to an embodiment.

Referring now to FIG. 11, results are illustrated of a simulation of the foregoing roll/yaw momentum management strategy. For the illustrated example, a specified outer yaw MSE deadband of 4 Nms, a specified inner yaw MSE deadband of 0.5 Nms, a specified outer roll MSE deadband of 5 Nms, and specified inner roll MSE deadband of 1 Nms are assumed. At time 'A', when the roll MSE reaches the specified outer dead band, a counteracting torque may be applied to reduce the MSE. In the illustrated example, the torque results from controlling an offset angle of a single solar array such that a positive roll torque and a negative yaw torque is provided. In the illustrated example, the offset angle is approximately 15 degrees. The offset angle may reduced to zero at time 'B', by which time the roll MSE has been reduced to the inner roll deadband and the yaw MSE has increased toward, but not reached, its outer deadband. At time 'C' when the roll MSE again reaches the specified outer dead band, a counteracting torque may be applied to reduce the MSE. In the illustrated example, the torque results from controlling an offset angle of the solar array such that a positive roll torque and a positive yaw torque are provided. In the illustrated example, the offset angle is approximately 15 degrees. As a result, during the time interval between time 'C' and time 'D' both roll MSE and yaw MSE are reduced.

Advantageously, the combined inertial roll/yaw torque resulting from controlling an offset angle of a single solar array may be selected from among (i) positive roll/positive yaw, (ii) positive roll/negative yaw, (iii) negative roll/positive yaw, and (iv) negative roll/negative yaw, such that the combined inertial roll/yaw torque reduces both roll momentum error and yaw momentum error.

The foregoing techniques may be repeated indefinitely, so as to provide continuous roll/yaw momentum management. In an embodiment, a low thrust north south stationkeeping thruster may also be employed to remove a residual roll/yaw momentum error. Advantageously, however, the above disclosed techniques permit momentum management without recourse to thrusters, or any actuator other than the solar array. As a result, a requirement for thruster actuation to unload momentum in at least the roll and yaw axes is substantially eliminated.

Advantageously, AMM may be performed such that selectively controlling at least one solar array position offset excludes reversing direction of the solar array with respect to a nominal solar array rotation and results in a minimal power loss. For example, the inventors have found that where the maximum array offset angle is 15 degrees, the instantaneous power loss is less than 4%, and the time-averaged power loss is an order of magnitude smaller.

Pitch MSE may be reduced by the spacecraft propulsion system, either during a dedicated momentum unload procedure, or in conjunction with another propulsive maneuver. For example, pitch MSE may be periodically reduced, by the spacecraft propulsion subsystem, only during low thrust north south stationkeeping maneuvers. Alternatively, pitch MSE may be unloaded by the spacecraft propulsion subsystem only during east west stationkeeping maneuvers In an embodiment, pitch axis momentum management may be provided while reducing or eliminating the need for thruster actuation. The present inventors have recognized that the principles of the above described roll and yaw momentum management techniques may also be advantageously applied to pitch momentum management, even though a solar array offset cannot ordinarily result directly in torque about the pitch axis.

For example, in an embodiment, a conventional low thrust north south stationkeeping (NSSK) maneuver, using, for example, a stationary plasma thruster (SPT) may be tailored to take advantage of the foregoing teachings. Conventionally, such SPTs are configured to dump roll/yaw momentum during a NSSK maneuver. However, when the yaw momentum is dumped, the SPT plume impingement injects some pitch momentum into the system. The net effect is that the amount of yaw momentum dumped is more than the pitch momentum gained. Residual pitch momentum is then dumped via the use of larger thrust, chemical (e.g., bi-propellant) thrusters.

In an embodiment, the SPTs may also be configured to dump roll/pitch momentum. Conventionally, such usage is avoided, because when the pitch momentum is dumped, yaw momentum is injected into the system due to the SPT plume impingements. Since the yaw momentum gained from the impingement effect is greater than the pitch momentum dumped, in the absence of the present teachings, the net gain in momentum is disadvantageous.

Taking the present teachings into account, however, it is advantageous to configure the SPTs to dump roll/pitch momentum because AMM is effective to dump yaw momentum at negligible system cost. Thus, the net yaw momentum injected due to the SPT plume impingement during SPT roll/pitch dumping, may be removed by AMM.

In a further embodiment, the SPT torque and plume impingement may be used to push momentum precisely to an inertial location that can be entirely removed by array torque. For example, assume that the alpha angle of a double-gimbaled SPT induces roll torque, and the theta angle induces a combination of pitch torque and yaw torque. Because of plume effects, it is not possible to drive the disturbance torque from the SPT to zero in all three axes at all times of year, so some momentum is induced. Because the array offsets cannot counter pitch torque, the theta angle is adjusted to minimize the pitch torque, allowing yaw momentum to accumulate. The alpha angle can then be adjusted so as to produce roll momentum that combines with the unavoidable yaw momentum accumulation to form either pure inertial yaw momentum to be removed with equal and opposite solar array offsets or inertial roll and inertial yaw momentum in a proportion that can be countered with the offset of a single array. Advantageously, the array angles need not be adjusted frequently. The inventors have found that daily or twice daily adjustments are sufficient. In this way, the accumulated momentum from one or two electric thruster activations may be dissipated by the array offsets over an entire day.

In a still further embodiment, pitch MSE may be reduced without recourse to the spacecraft propulsion system. To accomplish this, a pitch torque may be applied via a solar array actuation in a degree of freedom not conventionally available, or by use of "trim tabs". More specifically, a solar array may be configured so that its angle with respect to the spacecraft pitch axis is not necessarily fixed. By adjusting this angle, a torque about the pitch axis may be developed. Additionally, or instead of such a technique, a trim tab may be added to one or more edges of the solar array. Advantageously, such a trim tab may have "neutral" position wherein the solar array generates minimal or no torque about the pitch axis, and be adjustable, such that a desired pitch axis torque may be developed by adjusting the trim tab position away from neutral.

In an embodiment, the periodic component of the target momentum profile may be determined using a harmonic torque estimator (HTE). For example, the HTE may be provided with an angular velocity of the spacecraft relative to an inertial frame. The HTE may measure an actually stored momentum value by, for example, reading a speed of a reaction wheel. The HTE may be configured to (i) receive respective input values for an angular velocity of the spacecraft relative to an inertial frame, a wheel speed of at least one of reaction wheel, a predicted external torque, and (ii) estimate observable periodic torque based on the received respective input values.

In an embodiment, a 3-axis stabilized spacecraft such as, for example, referring to FIG. 1, spacecraft 10 may have two solar arrays 17 and two SADA's 18, angular momentum storage devices such as reaction wheels 15, and satellite control electronics 16. Satellite control electronics 16 may be configured to (i) determine a target profile of stored momentum as a function of time; (ii) calculate a difference between a momentum value actually stored on the spacecraft and a desired momentum value, where the desired momentum value conforms to the target profile at a particular time; and (iii) reduce the difference by controlling a torque on the spacecraft, where the torque results from selectively controlling at least one solar array position offset angle, the offset angle being an offset, of at least one solar array of the spacecraft, from the nominal sun pointing direction.

In an embodiment, satellite control electronics 16 may issue commands to SADA 18 whereby at least one solar array 17 is pointed away from its nominal sun pointing position to control the torque.

Advantageously, the target profile has a periodic component and reaction wheels 15 are configured to have a capacity sufficient to efficiently store the periodic component.

Thus, spacecraft momentum management techniques have been disclosed, whereby a variably commanded solar array offset causes actually stored spacecraft momentum to closely track a target profile. With the disclosed techniques, a requirement for thruster actuation to unload momentum is substantially eliminated, and a power loss due to solar array offset is minimal.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A method comprising:
   determining a target profile of stored momentum as a function of time for a spacecraft, the spacecraft including at least one solar array and a propulsion subsystem;
   measuring a momentum storage error (MSE), said MSE comprising a difference between a momentum value actually stored on the spacecraft and a desired momentum value, said desired momentum value conforming to the target profile at a particular time;
   reducing the MSE by producing a torque on the spacecraft, said torque resulting from selectively controlling at least one solar array position offset angle, said offset angle being an angle of the at least one solar array with respect to a nominal sun pointing direction.

2. The method of claim 1, wherein the spacecraft comprises two solar arrays, and reducing the MSE comprises selectively controlling the solar array position offset of only one of the two solar arrays.

3. The method of claim 1, wherein the spacecraft comprises two solar arrays, and reducing the MSE comprises selectively controlling the solar array position offset of each of the two solar arrays such that a first offset of a first solar array is substantially equal in magnitude and opposite in sign to a second offset of a second solar array.

4. The method of claim 1, wherein the target profile has a periodic component and the spacecraft comprises momentum storage devices having a capacity sufficient to store the periodic component.

5. The method of claim 4, wherein the periodic component of the target momentum profile is determined using a harmonic torque estimator (HTE).

6. The method of claim 5, wherein the HTE is configured to (i) receive respective input values for an angular velocity of the spacecraft relative to an inertial frame, a wheel speed of at least one reaction wheel, and a predicted external torque, and (ii) estimate observable periodic torque based on the received respective input values.

7. The method of claim 1, wherein the measuring step and the reducing step are performed as part of a substantially continuous feedback control loop.

8. The method of claim 1, wherein the measuring step is performed episodically at a first discrete interval and the reducing step is performed episodically at a second discrete interval.

9. The method of claim 8, wherein the first discrete interval is less than one hour and the second discrete interval is in the range of four to forty eight hours.

10. The method of claim 1, wherein each of the target profile and the actually stored momentum value are determined separately with respect to each of a yaw axis and a roll axis of the spacecraft, and the produced torque is one of (i) a substantially pure inertial yaw torque, and (ii) a combined inertial roll/yaw torque.

11. The method of claim 10, wherein the produced torque is the combined inertial roll/yaw torque selected from among (i) positive roll/positive yaw, (ii) positive roll/negative yaw, (iii) negative roll/positive yaw, and (iv) negative roll/negative yaw, such that the produced torque reduces a magnitude of at least one of a roll MSE and a yaw MSE.

12. The method of claim 11, wherein the produced torque reduces the magnitude of both roll MSE and yaw MSE.

13. The method of claim 1, wherein the MSE comprises a roll MSE, a yaw MSE, and a pitch MSE, and at least the roll MSE and the yaw MSE are reduced without recourse to the propulsion subsystem.

14. The method of claim 13, wherein the pitch MSE is reduced by the propulsion subsystem.

15. The method of claim 13, wherein the pitch MSE is periodically reduced by the propulsion subsystem only during low thrust north south stationkeeping maneuvers.

16. The method of claim 13, wherein the pitch MSE is periodically reduced by the propulsion subsystem only during east west stationkeeping maneuvers.

17. The method of claim 13, wherein the pitch MSE is reduced without recourse to the propulsion subsystem.

18. The method of claim 17, wherein the pitch MSE is reduced by producing a pitch torque on the spacecraft, said pitch torque resulting from at least one of adjusting an angle of at least one solar array with respect to a pitch axis of the spacecraft and actuating a solar array trim tab.

19. The method of claim 1, wherein the offset angle is not greater than 15 degrees.

20. The method of claim 1, wherein selectively controlling at least one solar array position offset excludes reversing direction with respect to a nominal solar array rotation.

21. The method of claim 1, wherein a low thrust north south stationkeeping thruster is employed to remove a residual roll/yaw momentum error.

22. The method of claim 1, wherein reducing the MSE by producing a torque on the spacecraft comprises:
   determining a solar array position offset to be controlled, an associated resulting torque, and a corresponding profile of wheel speed of a momentum storage device with respect to time; and
   feeding forward the corresponding profile of wheel speed with respect to time to the momentum storage device.

23. A spacecraft comprising:
   a satellite control electronics, a propulsion subsystem and at least one solar array, wherein:
   the satellite control electronics is configured to manage momentum of the spacecraft by: (i) determining a target profile of stored momentum as a function of time for the spacecraft; (ii) measuring a momentum storage error (MSE), said MSE comprising a difference between a momentum value actually stored on the spacecraft and a desired momentum value, said desired momentum value conforming to the target profile at a particular time; and (iii) reducing the MSE by producing a torque on the spacecraft, said torque resulting from selectively controlling at least one solar array position offset angle, said offset angle being an offset of at least one solar array of the spacecraft from a nominal sun pointing direction.

24. The spacecraft of claim 23, wherein the target profile has a periodic component and the spacecraft comprises momentum storage devices having a capacity sufficient to store said periodic component.

25. The spacecraft of claim 24, wherein the satellite control electronics determines the periodic component of the target profile using a harmonic torque estimator (HTE).

26. The spacecraft of claim 25, wherein the HTE is configured to (i) receive respective input values for an angular velocity of the spacecraft relative to an inertial frame, a wheel speed of at least one reaction wheel, a predicted external torque, and (ii) estimate observable periodic torque based on the received respective input values.

27. The spacecraft of claim 23, wherein the MSE comprises a roll MSE, a yaw MSE, and a pitch MSE, and at least the roll MSE and the yaw MSE are reduced without recourse to the propulsion subsystem.

28. The spacecraft of claim 27, wherein the pitch MSE is periodically reduced by the propulsion subsystem only during low thrust north south stationkeeping maneuvers.

29. The spacecraft of claim 27, wherein the pitch MSE is reduced without recourse to the propulsion subsystem.

30. The spacecraft of claim 27, wherein the offset angle is not greater than 15 degrees.

31. The spacecraft of claim 23, wherein selectively controlling at least one solar array position offset excludes reversing direction with respect to a nominal solar array rotation.

32. The spacecraft of claim 23, wherein a low thrust north south stationkeeping thruster is employed to remove a residual roll/yaw momentum error.

33. The spacecraft of claim 23, wherein reducing the MSE by producing a torque on the spacecraft comprises:
  determining a solar array position offset to be controlled, an associated resulting torque, and a corresponding profile of wheel speed of a momentum storage device with respect to time; and
  feeding forward the corresponding profile of wheel speed with respect to time to the momentum storage device.

* * * * *